Oct. 9, 1956

P. H. TAYLOR 2,766,037

HYDRA-SPRING WITH DIFFERENTIAL PISTON ACTION

Filed April 26, 1954

INVENTOR.
PAUL H. TAYLOR

BY
Attorney.

United States Patent Office 2,766,037
Patented Oct. 9, 1956

2,766,037

HYDRA-SPRING WITH DIFFERENTIAL PISTON ACTION

Paul H. Taylor, Grand Island, N. Y., assignor to Wales-Strippit Corporation, North Tonawanda, N. Y., a corporation of New York Application April 26, 1954, Serial No. 425,701

19 Claims. (Cl. 267—64)

The present invention relates to improvements in pressure vessels known as liquid springs.

Liquid springs take advantage of the limited compressibility of liquids, such as oil. As heretofore made, a device of this nature has comprised a chamber or vessel filled completely with a liquid and having a single piston reciprocable therein, which, under action of an outside force, compresses the liquid to provide a high pressure cushion for the elements between which the liquid spring may be interposed.

Single piston devices of this sort, however, even when of relatively small size, develop extremely high forces because of their high internal pressures which are in the order of twenty thousand to fifty thousand pounds per square inch. Many applications for such high force and high efficiency devices exist, among which may be mentioned their use in metal punching and fabricating presses. In such cases the pressure vessels or liquid springs operate efficiently as sturdy, compact units of a size commensurate with the design of and their application to the structures with which they are employed.

There are many situations, however, in which liquid springs of conventional design cannot be used, but in which liquid springs could desirably be employed if such devices were capable of producing much lower forces and longer strokes, or in other words, if the devices were capable of cushioning much smaller loads and longer strokes than those for which present single piston types are now adapted. For instance, liquid springs could be used advantageously in automobiles to replace the usual, well known mechanical springs now used, because of the relative simplicity of design and the rugged, compact construction of liquid springs.

In the case of an automobile having a gross unsprung body weight of say two thousand pounds, each of the four present mechanical springs is called upon to cushion an unsprung load in the range of five hundred pounds. A liquid spring of the conventional single-piston type suitable for handling a load in this low range, however, would require a piston diameter of perhaps only one sixty-fourth of an inch with a containing vessel of correspondingly tiny size. Such a device, even if it could be made, could not be provided with a practical seal to adequately serve the purpose required.

The problem, therefore, is to produce a liquid spring or pressure vessel capable of handling a relatively very small force applied thereto while utilizing the tremendous pressure available in liquid springs to make full and practical use of the resiliency of the liquid in the device, when compressed. Furthermore, since there are times when the body of a motor vehicle may be subjected to an abnormal load increasing its sprung weight, a liquid spring to be suitable for automotive purposes must be capable of efficiently handling such overload conditions.

A primary object of the present invention is to provide a liquid spring of practical design providing low force and long stroke characteristics.

A further object is to provide a liquid spring capable of use as a resilient member operable between elements or bodies under variable conditions wherein heavy duty service requirements are present, and which is effective even though only a relatively small force is applied to the device.

A related object is to provide a device of this sort which is particularly adapted for use as a spring element for cushioning the bodies of automotive vehicles.

A further object is to provide a liquid spring structure for the above purpose which is of a size commensurate with such use and which is rugged and sufficiently durable to withstand the abuses and wear to which the device may be subjected.

Another object of the invention is to provide a liquid spring structure which, while operating to resiliently cushion normal loads, as in a motor vehicle, is further capable of efficiently cushioning overload conditions as they occur.

A related object is to produce a device of the above type having a piston structure, comprising more than one piston, the component parts of which structure provide a differential in pressure therebetween, whereby a relatively small force may develop the desired cushioning effect.

A related object is to produce a structure of the above type in which, under abnormal or overload conditions, the differential action will be rendered ineffective, allowing the full area of one of the pistons to cushion the relatively much higher force then applied by such overload.

Other objects and advantages of the present invention will appear hereinafter from the following description and from the recital of the appended claims.

In the drawings, which form a part of this application:

Figure 1:
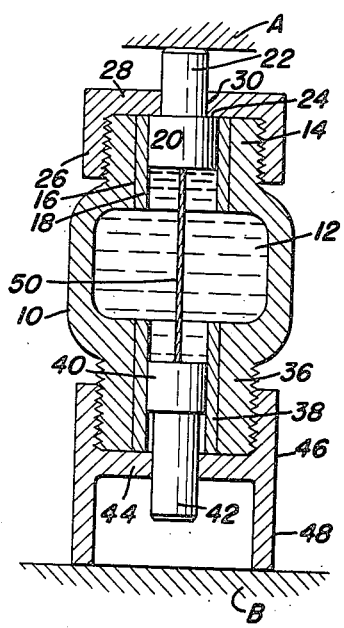
Fig. 1 is an axial section of a pressure vessel or liquid spring made according to one embodiment of the invention.

While the novel pressure vessel or liquid spring of this invention is adapted for many different applications or uses, it is here disclosed as a device for providing a normal and overload characteristic for machines, or for cushioning the unsprung weight, and the weight when loaded, say of the body of a motor vehicle. Accordingly, in the drawings A may represent the body or like part of a motor vehicle which it is desired to cushion, and B represents the frame or support for the body A, and relative to which the body may move.

The novel liquid spring illustrated in Fig. 1 includes a body or container 10 formed to provide a chamber 12 which is completely filled with a suitable liquid of limited compressibility, such as oil. At one end of the body 10 there is a reduced open end neck or extension 14 having a cylindrical bore 16 in which there is fitted a plastic sealing sleeve 18. Axially movable in the sleeve 18 is the body of a cylindrical piston 20 which is provided with a reduced shank 22. The piston is thus formed with an outer transverse shoulder 24.

The neck 14 of the body 10 has an exterior thread upon which may be screwed the annular threaded wall of a closure or cap 26. This cap has a central hole 30 therethrough through which the shank 22 of the piston 20 slides.

When the cap 26 is screwed down on neck 14 as shown, the inner face of its transverse end wall 28 bears against the end face of the neck 14. When the piston 20 is in the outer position shown, its transverse shoulder 24 also bears against the inner face of the cap wall 28.

At the opposite end of the body 10 there is another open end neck 36 which has a sealing sleeve 38 fitted therein which is axially alined with the sealing sleeve 18. A second piston 40 slidably engages in the bore of the sleeve 38, and the piston 40 has a shank 42 extending out beyond the outer end of the sleeve 38. This second piston 40 will be seen to be of a different and preferably lesser diameter than that of the first piston 20. This difference in diameters of the two pistons means that the two pistons have different areas, respectively, subject to the pressure of the liquid in the body of container 10. Thus, in use, there is a differential action between the two pistons, the result of which is that there is a net differential, and relatively low, force operable between parts A and B, as will be further explained hereinafter.

A cap 46 is threaded on the neck 36 and bears against the end face of the neck. The cap has an outer annular skirt or extension 48 projecting beyond the end wall 44 which forms an enclosure to surround and protect the shank 42 of piston 40. In use, the skirt 48 may be positioned to bear upon the frame B of the motor vehicle and its length is such that the piston shank 42 is prevented at all times from moving outwardly far enough to abut the frame B.

As clearly shown in Fig. 1, the two pistons 20 and 40 are connected by an element 50, such as a cable or other flexible member, which, under normal conditions of use of the liquid spring is retained under tension by the internal pressure of the oil or other liquid in the body 10 on the two pistons 20 and 40.

When the device is installed in a motor vehicle, such as a small pleasure car, for example, the outer end of the shank 22 of piston 20 is positioned under and to be engaged by the body A, as shown. In assembling the device of Fig. 1, the oil or liquid may be, and is preferably, initially pre-loaded to place the liquid in the chamber 12 under a selected pressure. This may be accomplished by filling the chamber with liquid and then forcing the piston 20 into the sleeve 18 by screwing the cap 28 upon the neck 14 and against the piston shoulder 24 after the other parts, including cap 46 have been put together. The pressure thus developed in chamber 12 can, in this way, be made such as to approximate the unsprung weight at one corner of a vehicle body A. By thus installing four of my pressure vessels or devices, one at each corner of the body A, the latter may be resiliently supported in unsprung or unloaded condition by engagement of the four piston shanks 22 therewith.

The novel features of the invention will now be apparent, if it is understood that the body A of the vehicle is properly supported in unloaded condition by providing pistons 20 and 40 for each of the liquid springs, such that the area of each piston 40 differs from that of the area of the associated piston 20 to such an extent that the net pressure developed in each device, which is the result of the differential in area between the two pistons, is say a pressure of 500 pounds. This pressure will not be the full or gross pressure of the liquid in chamber, as would be the case if one piston, such as piston 20 alone were used.

If now a vehicle is loaded, as by the presence of a driver and one or more passengers, or sprung weight is otherwise introduced, the body A will be lowered to various extents, and in use, will be in more or less continuous up and down displacement. Under such conditions the piston 20 will reciprocate in cap wall 28 and in sleeve 18. When the piston 20 moves toward chamber 12 the pressure of the oil in chamber 12 will be increased to a variable extent, because of the difference in area between pistons 20 and 40. The piston 40 is under internal pressure, of course, and would travel to the shoulder 44 except for the restraint of cable 50 so that it moves correspondingly in sleeve 38 by reason of its connection with piston 20 through its attached cable 50, or equivalent means. In this way the resiliency of the liquid, when thus further compressed, over and beyond the preload, may be availed of to provide adequate cushioning of the vehicle body when in use, with maximum riding quality.

In the construction just described, by reason of the proportion of the parts, the two connected pistons are free to shift up and down as a unit between their limits of stroke, since piston 20 will always under load be below its upper limit of movement where it would engage the cap 28. The piston 40 will likewise, under normal use, not engage the cap 46, nor will its shank 42 bottom against the frame B due to the presence of the cap skirt 48.

Obviously the device illustrated in Fig. 1 will operate the same if piston shank 22 were disposed to contact the relatively fixed element, and cap 46 were disposed to contact the movable element which it is desired to cushion, that is, if in Fig. 1 part A were to be the fixed element and part B the movable element.

The present invention is not limited, however, to the precise application described above. For example, the application of force to operate the device may be imparted to only the smaller instead of also to the larger piston, and the movable or force-applying element, namely the body A in Fig. 1, may be disposed below instead of above the frame or stationary element. In this latter event a higher force, short-stroke spring is provided with the same parts.

Figure 3:
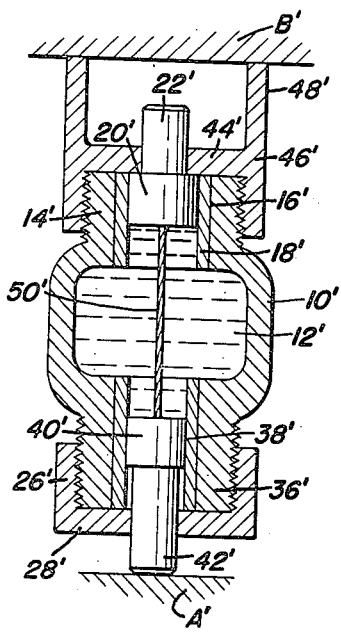
Fig. 3 is another similar section showing a still different construction of the pressure vessel or liquid spring.

Such a rearrangement is illustrated in Fig. 3. Here the body 10' of the device has a chamber 12', the necks or extensions 14' and 36' of which carry the sleeves 18' and 38', respectively, similar to the embodiment illustrated in Fig. 1. Here, however, the larger piston 20' engages the transverse end wall 44' of a cap 46'. The shank 22' of piston 20' passes through a central hole in wall 44' and is surrounded by the annular skirt 48', which may form a part of cap 46'. The skirt engages at its free outer end with the frame or other stationary element B', and prevents the force from being applied directly to the piston 20'. Piston 20', however, is, as before, connected to a piston 40' of smaller area by a cable or the like element 50'. In this arrangement the force for operating the device is derived from the relatively movable body or element A' which engages the shank 42' of the smaller piston 40' to actuate only the latter. In this rearrangement, or modification, of the invention there is no differential action.

The shank 42' of the smaller piston 40' extends through a central hole in the transverse wall 28' of a cap 26' screwed on the neck 36' of the vessel. The shank 42' engages the movable or force-applying element A'. The shank 42' is free to move towards and from the body of the device, since there is no skirt on the cap 26' to restrain movement of the element A' relatively to the intervening liquid spring.

The arrangement of Fig. 3 will give a different performance from the device of Fig. 1. Thus, actuation of the smaller piston 40' in Fig. 3 will provide a short-stroke, high-force action different from the long-stroke, low-force action of Fig. 1.

The liquid spring or pressure vessel of Fig. 1 may be expected to fully meet conditions, and resiliently and smoothly serve the purpose for which it may, in general, be intended to serve. However there are instances where severe overload conditions may, at times, be expected. As an instance, a greater than an intended load may be placed upon the body of a motor vehicle, such as a truck.

Figure 2:
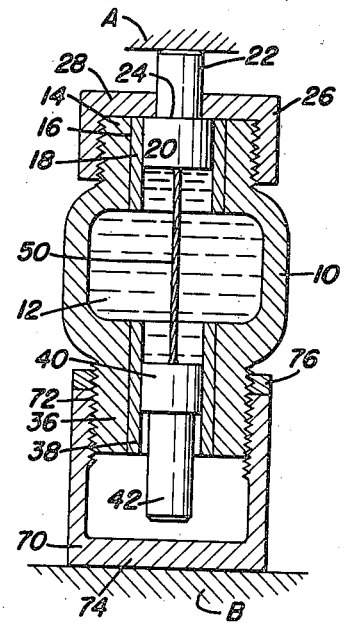
Fig. 2 is a similar section of a modified construction having particularly means for adjustably compensating for overload conditions.

The vessel or liquid spring shown in Figs. 1 and 2 is intended to meet the foregoing and other overload conditions. All of the parts of the device of Fig. 2, with the exception of the cap attached to the neck 36, are of the same construction as the corresponding parts in Fig. 1, and they are therefore identified by the same reference characters.

For closing the lower end of the body 10 of the liquid spring in Fig. 2, there is provided a cap 70, the open end of which is interiorly threaded as denoted at 72 to thread on neck 36 of body 10. The length of this cap 70 is such that, when the shank 42 of piston 40 is in its most elevated or normal, unloaded position, where it is held by engagement of piston 20 with cap wall 28, and by cable 50, the lower transverse end wall 74 of the cap is positioned a distance beyond the lower end of piston shank 42, as shown. In this position of the parts, the outer face of the wall 74 may be operatively engaged by, or rest upon, the frame or fixed element B. Preferably the cap 70 is adjustably secured on the neck 36, and is held in desired position by a lock nut 76. In this way the stated distance between the end of the piston shank 42 and the wall 74 may be varied, as desired.

The device of Fig. 2 may operate under normal conditions, after being pre-loaded, just as does the device of Fig. 1. Thus, under normal operating conditions, when the loaded body is in movement, the piston 20 will be variably depressed, with corresponding depression of piston 40.

Under the generally expected conditions, the oscillation of the pistons 20 and 40 will not be sufficient to cause the shank 42 to bottom upon or engage the cap wall 74. However, should an overload condition occur, the body A will then depress the piston 20 to an abnormal extent and thus cause the shank 42 of piston 40 to bottom upon or engage the cap wall 74.

Further downward movement of the piston 20 will not then be able to cause further depression of piston 40. The cable 50 will therefore slacken, while piston 20 will thence descend alone.

As long as the overload remains the resulting action results in compression of the oil or liquid by the force applied to piston 20 alone. Under such conditions the resistant force is that of the piston 20 alone. Hence the full area of that piston is acted upon by the pressurized liquid, since there will then be no differential pressure action between the two pistons. This also provides a short-stroke, high-force, overload spring condition. The action then duplicates the action of the arrangement of Fig. 1, since when piston 42 engages part B the area of piston 20 is thereafter effective, rather than the difference in areas of pistons 20 and 40. However, in the embodiment of Fig. 2, since the cap 70 is threadably adjustable, the point of application of the overload can be determined precisely.

In this manner a very powerful pressure is developed in the oil spring, as occurs in the known single-piston types of liquid springs. The overload condition which has been forced upon the vehicle is thus adequately coped with, and possible resulting damage is avoided.

While the invention has been described in connection with several different embodiments thereof, it will be understood that it is capable of further modification. This application is intended to cover any variations, uses, or adaptations of the invention, following, in general, the principles of the invention and including such departures from the present disclosure as come within known or customary practice in the art to which the invention pertains and may be applied to the essential features hereinbefore set forth and as fall within the scope of the invention or the limits of the appended claims.

Having thus described my invention, what I claim is:

1. A liquid spring comprising a body having a chamber therein filled with liquid, two pistons reciprocable in said chamber and having, respectively, operating areas of different size, means connecting said two pistons so that they may reciprocate together, and one of said pistons being disposed to be engageable by a force outside said body to operate both pistons to thereby compress said liquid, the net difference in said operating areas of said two pistons effecting the development of a relatively low pressure in said chamber.

2. A liquid spring comprising a body having a chamber therein filled with liquid, two axially-aligned, spaced pistons reciprocable in said chamber and having, respectively, operating areas of different size, means connecting said two pistons together for reciprocation in unison, each of said two pistons being mounted to project in part out of said chamber, whereby one may be engaged by an outside force to actuate both pistons to compress the liquid in said chamber.

3. A liquid spring comprising a body having a chamber therein filled with liquid, two pistons spaced apart in axial alinement in said chamber, means connecting said two pistons together for reciprocation in unison, one of said pistons having a part projecting from one end of said body and the other piston having a part projecting from the other end of said body, whereby one of said piston parts may be engaged by an outside force to operate both pistons to compress the liquid in said chamber, said two pistons having operating areas of different size, respectively, the net difference between which results in the development of a relatively low pressure by said liquid spring.

4. A liquid spring comprising a body having a chamber open at opposite ends, a closure for each end of said chamber, a compressible liquid filling said chamber, a piston reciprocable in each end of said chamber, said pistons having operating areas of different size, means for connecting said pistons together for reciprocation in unison, each piston having a portion projecting outwardly through the adjacent closure, one of said outside portions being engageable by an outside force-applying element to simultaneously actuate both pistons, and means extending about and outwardly beyond the outwardly projecting portion of said other piston to prevent application to it and to its piston of an outside force at its end of said body.

5. A liquid spring comprising a body having a chamber open at opposite ends, a closure for each end of said chamber, a compressible liquid filling said chamber, a piston reciprocable in each end of said chamber, said pistons having operating areas of different size, flexible means for connecting said pistons for reciprocation in unison, and one of said pistons having a part projecting through and beyond the closure member adjacent thereto for engagement by a movable force-applying element for actuation of said two connected pistons.

6. A liquid spring comprising a body having a chamber open at opposite ends, a closure for each end of said chamber, a compressible liquid filling said chamber, a piston reciprocable in each end of said chamber, said pistons having operating areas of different size, flexible means connecting said pistons for reciprocation in unison, one of said pistons having a part projecting through and beyond the closure member adjacent thereto for engagement by a movable force-applying element for actuation of the two pistons, the other piston likewise having a projecting part movable through the adjacent closure, and a skirt secured to the latter closure and engageable with an element for supporting the liquid spring, said skirt being extended about and protecting the projecting part of said other piston from engagement with said supporting element.

7. A liquid spring comprising a body having a chamber therein filled with liquid, two pistons reciprocable in said chamber and having, respectively, operating areas of different size, means connecting said two pistons for reciprocation in unison, said body being adapted to be interposed between two relatively movable parts, one of said pistons extending in part out of said body for engagement by one of said parts for imparting an outside force thereto for actuating said connected pistons to compress the liquid in said chamber to develop pressure therein, and means for holding the other piston out of engagement with the other of said parts.

8. A liquid spring comprising a body having a chamber therein filled with liquid, two pistons in said chamber having, respectively, operating areas of different size, a flexible element connecting said two pistons, and one of said pistons being engageable by a variable force outside said body to move the same in one direction in said chamber to compress the liquid in said chamber, the resulting action operating to move the other piston in unison therewith and in the same direction and placing said flexible element under tension, said first piston, upon lessening of the outside force, shifting in the opposite direction and pulling said second piston therewith through said flexible element.

9. A liquid spring which may be interposed between a supporting element and an element comprising a load to be resiliently supported by said liquid spring and operable as an outside force thereon, said spring comprising a body having a chamber filled with liquid, two pistons in said chamber having, respectively, operating areas of different size, means connecting said two pistons for reciprocation as a unit to enable the differential in area between said pistons to compress said liquid to develop low pressure, one of said pistons being disposed to be actuated by said load, and means for maintaining said other piston free of engagement by said supporting element.

10. A liquid spring which may be interposed between a supporting element and an element comprising a load to be resiliently supported by said liquid spring and operable as an outside force thereon, comprising a body having a chamber filled with liquid, two pistons in said chamber having, respectively, operating areas of different size, flexible means connecting said two pistons for operation as a unit to compress said liquid to a predetermined load limit, one of said pistons being disposed to be actuated by said outside force, and means for restraining the other piston from operation in unison with said first piston when said predetermined load limit has been exceeded.

11. A liquid spring which may be interposed between a supporting element and an element comprising a load to be resiliently supported by said liquid spring and operable as an outside force thereon, comprising a body having a chamber filled with liquid, two pistons in said chamber having, respectively, operating areas of different size, flexible means connecting said two pistons for reciprocation as a unit to compress said liquid to a predetermined load limit, one of said pistons being disposed for actuation by said outside force, and means on said body operable, when said load limit is exceeded, to restrain the other piston from further action so that said first piston alone may then act to compress the liquid to resiliently carry the overload.

12. A liquid spring which may be interposed between a supporting element and an element comprising a load to be resiliently supported by said liquid spring and operable as an outside force thereon, comprising a body having a chamber filled with liquid, two pistons in said chamber having, respectively, operating areas of different size, flexible means connecting said two pistons for operation as a unit to compress said liquid to a predetermined load limit, the piston having the larger operating area being disposed to be engaged and actuated by said outside force, means secured to said body and disposed to engage the other piston when said load limit is exceeded for restraining the other piston from further action, so that said piston of larger operating area may then alone act to further compress the liquid in said chamber to develop high pressure for resiliently carrying the overload.

13. A liquid spring adapted to be mounted between two relatively movable elements, comprising a body open at opposite ends and having a chamber therein which is adapted to be filled with liquid, a pair of pistons mounted at opposite ends of said chamber to reciprocate therein, caps for closing the opposite ends of said chamber, each of said pistons having a shank portion projecting exteriorly of the chamber through a hole in the associated cap, flexible means connecting the two pistons to reciprocate together, the area of the interior face of one piston being greater than the area of the interior face of the other piston, and a member secured to said body, which projects axially beyond the body a greater distance than the normal stroke of one piston outwardly of said body, to prevent contact of the shank portion of said one piston with one of the elements between which the liquid spring is mounted.

14. A liquid spring comprising a body open at opposite ends and having a chamber therein which is adapted to be filled with liquid, a pair of pistons mounted at opposite ends of said chamber to reciprocate therein, caps for closing the opposite ends of said chamber, each of said pistons having a shank portion projecting exteriorly of the chamber through a hole in the associated cap, flexible means connecting the two pistons to reciprocate together, the area of the interior face of one piston being greater than the area of the interior face of the other piston, and a member secured to said body, which projects axially beyond the body a greater distance than the normal stroke of one piston outwardly of said body, to prevent contact of the shank portion of said one piston with one of the elements between which the liquid spring is mounted, said member having a transverse wall against which the shank portion of said one piston may abut when said one piston is forced by overload outwardly of said body beyond its normal stroke limit.

15. A liquid spring comprising a body open at opposite ends and having a chamber therein which is adapted to be filled with liquid, a pair of pistons mounted at opposite ends of said chamber to reciprocate therein, caps for closing the opposite ends of said chamber, each of said pistons having a shank portion projecting exteriorly of the chamber through a hole in the associated cap, flexible means connecting the two pistons to reciprocate together, the area of the interior face of one piston being greater than the area of the interior face of the other piston, and a member secured to said body, which projects axially beyond the body a greater distance than the normal stroke of one piston outwardly of said body, to prevent contact of the shank portion of said one piston with one of the elements between which the liquid spring is mounted, said member having a transverse wall against which the shank portion of said one piston may abut when said one piston is forced by overload outwardly of said body beyond its normal stroke limit, said member being adjustable on said body to adjust the amount of the projection of its transverse wall beyond said body.

16. A liquid spring adapted to be mounted between two relatively movable elements, comprising a body open at opposite ends and having a chamber therein which is adapted to be filled with liquid, caps for closing opposite ends of said chamber, a pair of pistons mounted at opposite ends of said chamber to reciprocate therein, means connecting said pair of pistons for reciprocation together, each piston having a shank portion projecting through a hole in the adjacent cap, the area of the inner face of one piston being greater than the area of the inner face of the other piston, and a member secured to said body which projects axially beyond the body a greater distance than the shank portion of the piston which has the inner face of larger area, said member being engageable with one of said elements, and the shank portion of said other piston being engageable with the other of said elements.

17. A liquid spring comprising a body having a chamber therein filled with a compressible liquid, two pistons reciprocable in said chamber and having, respectively, operating areas of different size, means connecting said two pistons so that they may reciprocate together, the piston having the larger operating area being disposed to be engageable by a force outside said body to operate both pistons to thereby compress said liquid, the net difference in said operating areas of said two pistons effecting the development of a relatively low pressure by said spring.

18. A liquid spring comprising a body having a chamber therein filled with a compressible liquid, two axially-aligned, spaced pistons reciprocable in said chamber and having, respectively, operating areas of different size, means connecting said two pistons together for reciprocation in unison, each of said two pistons being mounted to project in part out of said chamber, means surrounding said pistons for preventing leakage of liquid from said chamber, the piston having the larger operating area being disposed to be engageable by a force outside said body to operate both pistons to thereby compress said liquid.

19. A liquid spring, which may be interposed between a supporting element and an element comprising a load to be resiliently supported by said liquid spring and operable as an outside force thereon, said spring comprising a body having a chamber filled with a compressible liquid, means for sealing against leakage of said liquid from said chamber, piston means having two components in said chamber of different operating areas, respectively, means connecting said two components so that they may be operated as a unit to compress said liquid to a predetermined load limit, the piston component having the larger operating area being engageable by said outside force to actuate both components, and means for restraining the piston component having the smaller operating area from operation in unison with the piston component having the larger operating area when said predetermined load limit has been exceeded.

References Cited in the file of this patent

UNITED STATES PATENTS

| | | |
|---|---|---|
| 254,917 | Canet | Mar. 14, 1882 |
| 880,257 | Welch | Feb. 25, 1908 |
| 2,346,667 | Dowty | Apr. 18, 1944 |